US012534169B2

(12) United States Patent
Kato

(10) Patent No.: US 12,534,169 B2
(45) Date of Patent: Jan. 27, 2026

(54) OUTBOARD MOTOR AND BOAT

(71) Applicant: YAMAHA HATSUDOKI KABUSHIKI KAISHA, Iwata (JP)

(72) Inventor: Yosuke Kato, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 425 days.

(21) Appl. No.: 18/134,598

(22) Filed: Apr. 14, 2023

(65) Prior Publication Data

US 2024/0140576 A1 May 2, 2024

(30) Foreign Application Priority Data

Nov. 2, 2022 (JP) ................................ 2022-175952

(51) Int. Cl.

| | |
|---|---|
| ***B63H 20/00*** | (2006.01) |
| ***B63H 20/08*** | (2006.01) |
| ***F02M 37/02*** | (2006.01) |
| ***F02M 37/10*** | (2006.01) |
| ***F02M 37/20*** | (2006.01) |
| ***F02M 37/24*** | (2019.01) |
| ***F02M 37/32*** | (2019.01) |
| ***F02M 69/54*** | (2006.01) |

(52) U.S. Cl.

CPC ........... *B63H 20/001* (2013.01); *B63H 20/08* (2013.01); *F02M 37/02* (2013.01); *F02M 37/106* (2013.01); *F02M 37/20* (2013.01); *F02M 37/24* (2019.01); *F02M 37/32* (2019.01); *F02M 69/54* (2013.01)

(58) Field of Classification Search

CPC ...... B63H 20/001; B63H 20/08; F02M 37/32; F02M 37/24; F02M 37/02; F02M 37/106; F02M 37/20; F02M 69/54

See application file for complete search history.

(56) References Cited

U.S. PATENT DOCUMENTS

| | | | | |
|---|---|---|---|---|
| 7,159,568 B1 * | 1/2007 | Lewis | .................. F02D 19/081 123/576 |
| 2003/0045186 A1 * | 3/2003 | Wada | .................... F02B 61/045 440/88 F |
| 2006/0107931 A1 * | 5/2006 | Ochiai | .................. F02M 37/20 123/516 |

FOREIGN PATENT DOCUMENTS

| | | |
|---|---|---|
| JP | 2006-082714 A | 3/2006 |

* cited by examiner

*Primary Examiner* — Stephen P Avila

(74) *Attorney, Agent, or Firm* — Keating & Bennett, LLP

(57) ABSTRACT

An outboard motor includes an engine and a plurality of fuel supply mechanisms each including a suction pump to suck in liquid fuel stored in a fuel tank in a hull, a vapor separator tank to store liquid fuel sucked in by the suction pump and separate the liquid fuel and vapor, and a supply pump to supply the liquid fuel stored in the vapor separator tank to the engine.

13 Claims, 6 Drawing Sheets

OUTBOARD MOTOR AND BOAT

CROSS REFERENCE TO RELATED APPLICATIONS

This application claims the benefit of priority to Japanese Patent Application No. 2022-175952 filed on Nov. 2, 2022. The entire contents of this application are hereby incorporated herein by reference.

BACKGROUND OF THE INVENTION

1. Field of the Invention

The techniques disclosed herein relate to an outboard motor and a boat.

2. Description of the Related Art

A boat is provided with a hull and an outboard motor mounted to the rear of the hull (see, e.g., Japanese Unexamined Patent Application Publication No. 2006-82714). The outboard motor is a device that generates thrust to propel the boat.

The outboard motor includes an engine, and a fuel supply mechanism including a suction pump, a vapor separator tank, and a supply pump. The suction pump sucks in liquid fuel stored in a fuel tank arranged in the hull. The vapor separator tank stores liquid fuel sucked in by the suction pump and separates the liquid fuel and the vapor. The supply pump supplies the liquid fuel stored in the vapor separator tank to the engine.

Conventional outboard motors have only one fuel supply mechanism. The single fuel supply mechanism has a limited fuel suction capacity, which may result in problems such as insufficient fuel supply to the engine due to, e.g., vapor lock at the suction pump.

SUMMARY OF THE INVENTION

Preferred embodiments of the present invention provide fuel supply mechanisms that are each able to solve the above-described problems.

According to a preferred embodiment of the present invention, an outboard motor includes an engine and a plurality of fuel supply mechanisms. Each of the fuel supply mechanisms includes a suction pump to suck in liquid fuel stored in a fuel tank arranged in a hull, a vapor separator tank to store liquid fuel sucked in by the suction pump and separate the liquid fuel and vapor, and a supply pump to supply the liquid fuel stored in the vapor separator tank to the engine.

Preferred embodiments of the invention disclosed herein may be implemented in a variety of aspects, including, e.g., in an outboard motor and a boat equipped with an outboard motor and a hull, among other structures.

According to preferred embodiments of the present invention, outboard motors are able to reduce or prevent shortage of fuel supply to the engine caused by vapor lock at the suction pump.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
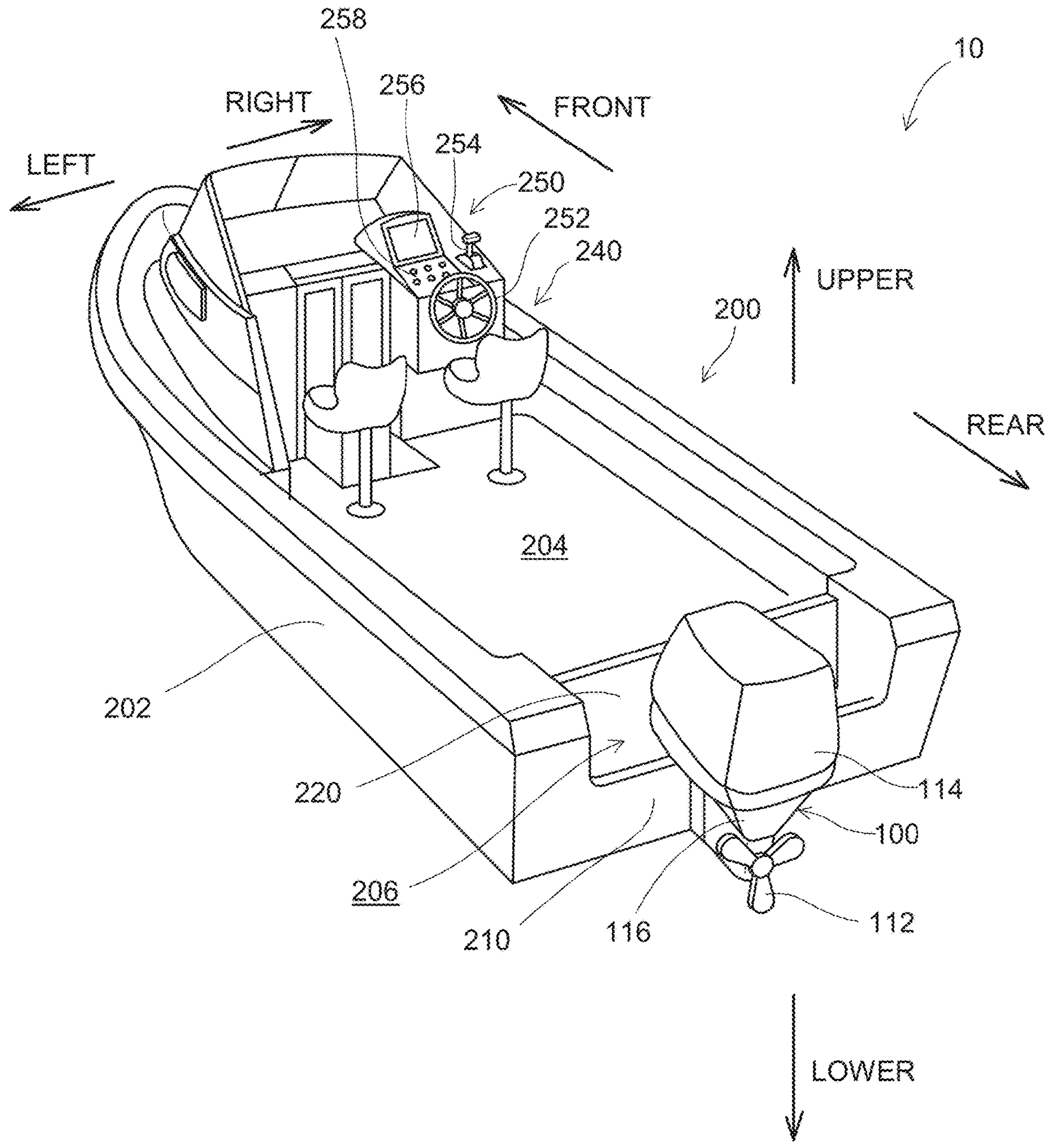
FIG. 1 is a perspective view schematically illustrating a configuration of a boat according to a preferred embodiment of the present invention.

FIG. 1 is a perspective view schematically illustrating a configuration of a boat 10 according to a preferred embodiment of the present invention. FIG. 1 and other figures described below show arrows representing each direction with respect to the position of the boat 10. More specifically, each figure shows arrows representing the front direction (FRONT), rear direction (REAR), left direction (LEFT), right direction (RIGHT), upward direction (UPPER), and downward direction (LOWER), respectively. The front-rear direction, left-right direction, and upper-lower (vertical) direction are perpendicular to each other.

The boat 10 includes a hull 200 and an outboard motor 100.

The hull 200 is an area of the boat 10 for occupants to ride. The hull 200 includes a hull main body 202 including a living space 204, a pilot seat 240 installed in the living space 204, and an operating device 250 installed near the pilot seat 240. The operating device 250 includes, e.g., a steering wheel 252, a shift/throttle lever 254, a monitor 256, and an input device 258. The hull 200 includes a partition wall 220 to partition the rear end of the living space 204 and a transom 210 positioned at the rear end of the hull 200. In the front-rear direction, a space (hereinafter referred to as “rear end upper space 206”) is provided between the transom 210 and the partition wall 220.

Figure 2:
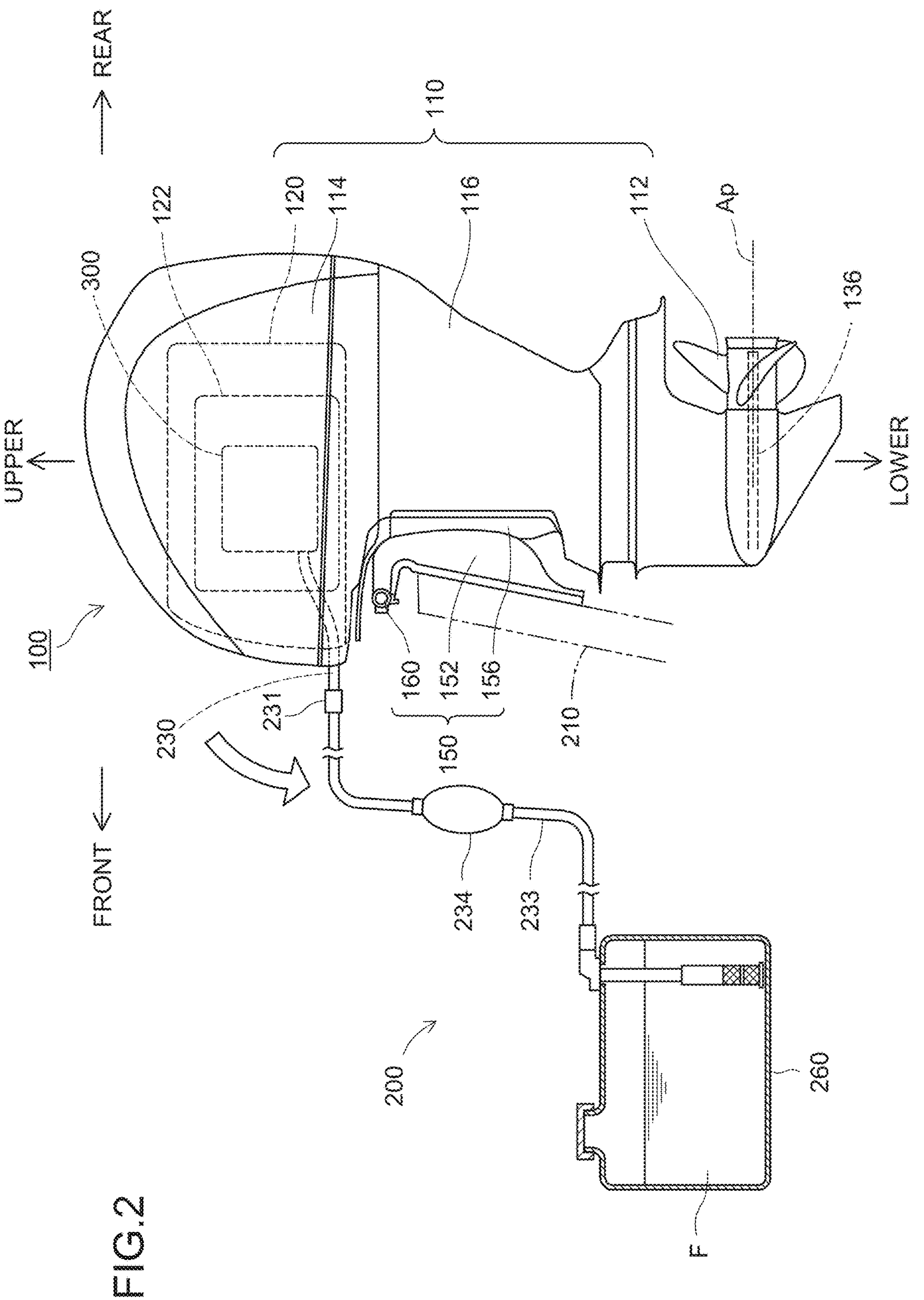
FIG. 2 is a side view schematically illustrating a configuration of an outboard motor.

FIG. 2 is a side view schematically illustrating a configuration of the outboard motor 100. FIG. 2 shows a fuel tank 260 provided in the hull main body 202 of the hull 200. The outboard motor 100 in the reference attitude will be described below unless otherwise specified. The reference attitude is an attitude in which the rotational axis Ap of a propeller shaft 136, which will be described below, extends in the front-rear direction. The front-rear direction, the left-right direction, and the upper-lower direction are respectively defined based on the outboard motor 100 in the reference attitude.

The outboard motor 100 generates thrust to propel the boat 10. The outboard motor 100 is attached to the transom 210 at the rear of the hull 200. The outboard motor 100 includes an outboard motor main body 110 and a suspension device 150.

The outboard motor main body 110 includes an engine assembly 120, a propeller 112, a cowl 114, and a casing 116.

The engine assembly 120 is an assembly of a plurality of components including an engine main body 122 as a main component. In addition to the engine main body 122, the engine assembly 120 includes a fuel supply mechanism 300, an upstream pipe 230, and a water separation filter 235 (see, e.g., FIG. 3). The engine assembly 120 is disposed at a relatively upper position in the outboard motor 100. The configuration of the fuel supply mechanism 300, the upstream pipe 230, and the water separation filter 235 will be described below.

The engine assembly 120 is accommodated within the cowl 114. The engine main body 122 is a prime mover to generate power. The engine main body 122 includes, e.g., an internal combustion engine. The engine main body 122 includes a cylinder (not shown) housing a piston that reciprocates with combustion of a mixture containing fuel and air, and a crank shaft (not shown) which rotates with reciprocation of the piston. The cylinder is provided with a cylinder body that houses the piston and a cylinder head that, together with the piston and cylinder body, forms a combustion chamber in which the mixture burns. The cylinder head includes multiple intake ports opened and closed by intake valves and multiple exhaust ports opened and closed by exhaust valves. In the present preferred embodiment, the engine main body 122 is a V-type engine including a pair of banks 123 (see FIG. 4), and cylinders are arranged in each bank 123.

The propeller 112 is a rotating body including a plurality of blades and is rotatable around the rotational axis Ap of the propeller shaft 136. The propeller 112 is at a relatively lower position in the outboard motor 100. The propeller 112 generates thrust by rotating with the power generated in the engine assembly 120.

The suspension device 150 suspends the outboard motor main body 110 to the hull 200. The suspension device 150 includes a pair of left and right clamp brackets 152, a tilt shaft 160, and a swivel bracket 156.

The pair of left and right clamp brackets 152 are disposed behind the hull 200 in a state separated from each other in the left-right direction, and are fixed to the transom 210 of the hull 200 by using, e.g., bolts. Each clamp bracket 152 includes a through hole therethrough extending in the left-right directions.

The tilt shaft 160 is a rod-shaped member. The tilt shaft 160 is rotatably supported in the through hole of the clamp bracket 152. The tilt shaft 160 extends along the horizontal direction. The outboard motor 100 is tiltable around the tilt shaft 160 (see the blank arrow in FIG. 2).

Specifically, the angle around the tilt shaft 160 of the outboard motor main body 110 may be changed from the tilt-down state in which the propeller 112 is located under the water surface (see FIG. 1 and FIG. 2 in which the outboard motor 100 is in the reference attitude) to the tilt-up state in which the propeller 112 is located above the water surface.

The swivel bracket 156 is sandwiched between the pair of clamp brackets 152, and supported rotatably around the tilt shaft 160.

Figure 3:
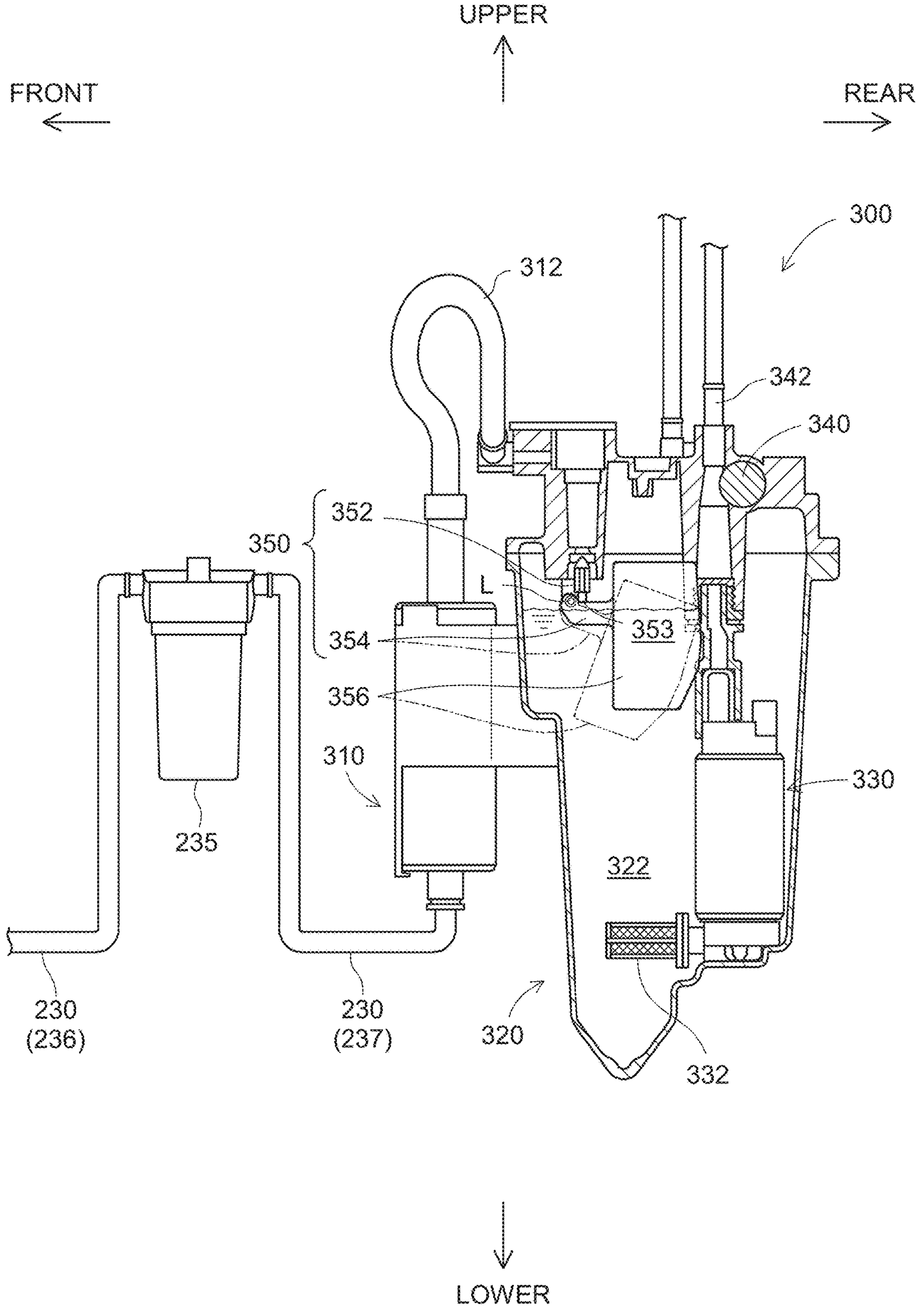
FIG. 3 is a partial sectional view schematically illustrating a configuration of a fuel supply mechanism, among others.

FIG. 3 is a partial sectional view schematically illustrating the configuration of the fuel supply mechanism 300, among others. FIG. 3 illustrates a side view of a portion of the fuel supply mechanism 300. As shown in FIG. 3, the fuel supply mechanism 300 is provided with a suction pump 310, a vapor separator tank 320, a supply pump 330, and a pressure regulator 340.

The suction pump 310 (e.g., a low-pressure pump) includes a driving motor (not shown) in an insulation case extending in the upper-lower direction to suck in liquid fuel F stored in the fuel tank 260. In the present preferred embodiment, the suction pump 310 is located in front of the vapor separator tank 320. The vapor separator tank 320 is fixed to the suction pump 310. A suction port located at the lower end of the suction pump 310 is connected to one end of the upstream pipe 230.

As shown in FIG. 2, a fuel joint 231 is provided at the other end of the upstream pipe 230. This fuel joint 231 is connected to a tip of a connecting pipe 233 extending from the fuel tank 260. The connecting pipe 233 is provided with a manual pump 234. The suction pump 310 (fuel supply mechanism 300) is located higher than the fuel tank 260. Therefore, the suction pump 310 requires suction force to suck up the liquid fuel F stored in the fuel tank 260 through the connecting pipe 233 and the upstream pipe 230. The output port located at the upper end of the suction pump 310 is connected to one end of a downstream pipe 312 (see FIG. 3).

The vapor separator tank 320 stores the liquid fuel F sucked in by the suction pump 310 and separates the liquid fuel F and the vapor. Specifically, the vapor separator tank 320 includes a housing space 322. The housing space 322 houses an opening/closing valve 350 and a float 356. The opening/closing valve 350 includes a valve 352 and a pivot arm 354. The upper end of the valve 352 is connected to the other end of the downstream pipe 312, and the lower end of the valve 352 is provided with an introduction hole 353 therein. Therefore, the liquid fuel F sucked in by the suction pump 310 may be supplied to the housing space 322 of the vapor separator tank 320 through the downstream pipe 312 and the valve 352.

The pivot arm 354 is located below the valve 352. The front end of the pivot arm 354 is supported so as to be able to pivot around the pivot shaft L. The pivot shaft L of the pivot arm 354 is positioned forward of the introduction hole 353 of the valve 352 and extends parallel or substantially parallel to the tilt shaft 160. The pivot shaft L of the pivot arm 354 is arranged between the tilt shaft 160 and the float 356 in the front-rear direction (see FIGS. 2 and 3). The rear end of the pivot arm 354 supports the float 356. With such a configuration, the pivot arm 354 is able to move to either a closing position to close the introduction hole 353 (see the solid line in FIG. 3) or an opening position to open the introduction hole 353 (see the double-dashed line in FIG. 3) according to an up/down movement of the float 356.

When the amount of liquid fuel F stored in the housing space 322 is sufficient, the float 356 moves upward due to buoyancy by the liquid fuel F to place the pivot arm 354 in the closing position. In contrast, when the amount of liquid fuel F stored in the housing space 322 decreases, the float 356 moves downward to place the pivot arm 354 in the opening position. In this way, the vapor separator tank 320 is configured to have a float type opening/closing valve. Also, in the fuel supply mechanism 300, when the outboard motor 100 changes from the tilt-down state to the tilt-up position, it is possible to prevent movement of the opening/closing valve (pivot arm 354) in the vapor separator tank 320 from the opening position to the closing position.

The supply pump 330 (e.g., a high-pressure pump) supplies (injects) the liquid fuel F stored in the vapor separator tank 320 to the engine main body 122 (injector). Specifically, the supply pump 330 includes a suction portion 332 located in the housing space 322 of the vapor separator tank 320, and a discharge portion connected to one end of a discharge pipe 342. The liquid fuel F stored in the housing space 322 is sucked into the suction portion of the supply pump 330 and discharged to the discharge pipe 342.

The pressure regulator 340 is located downstream of the supply pump 330 to regulate the injection pressure from the supply pump 330.

The water separation filter 235 is provided in the upstream pipe 230. The water separation filter 235 removes foreign matter from the liquid fuel F flowing in the upstream pipe 230.

Figure 4:
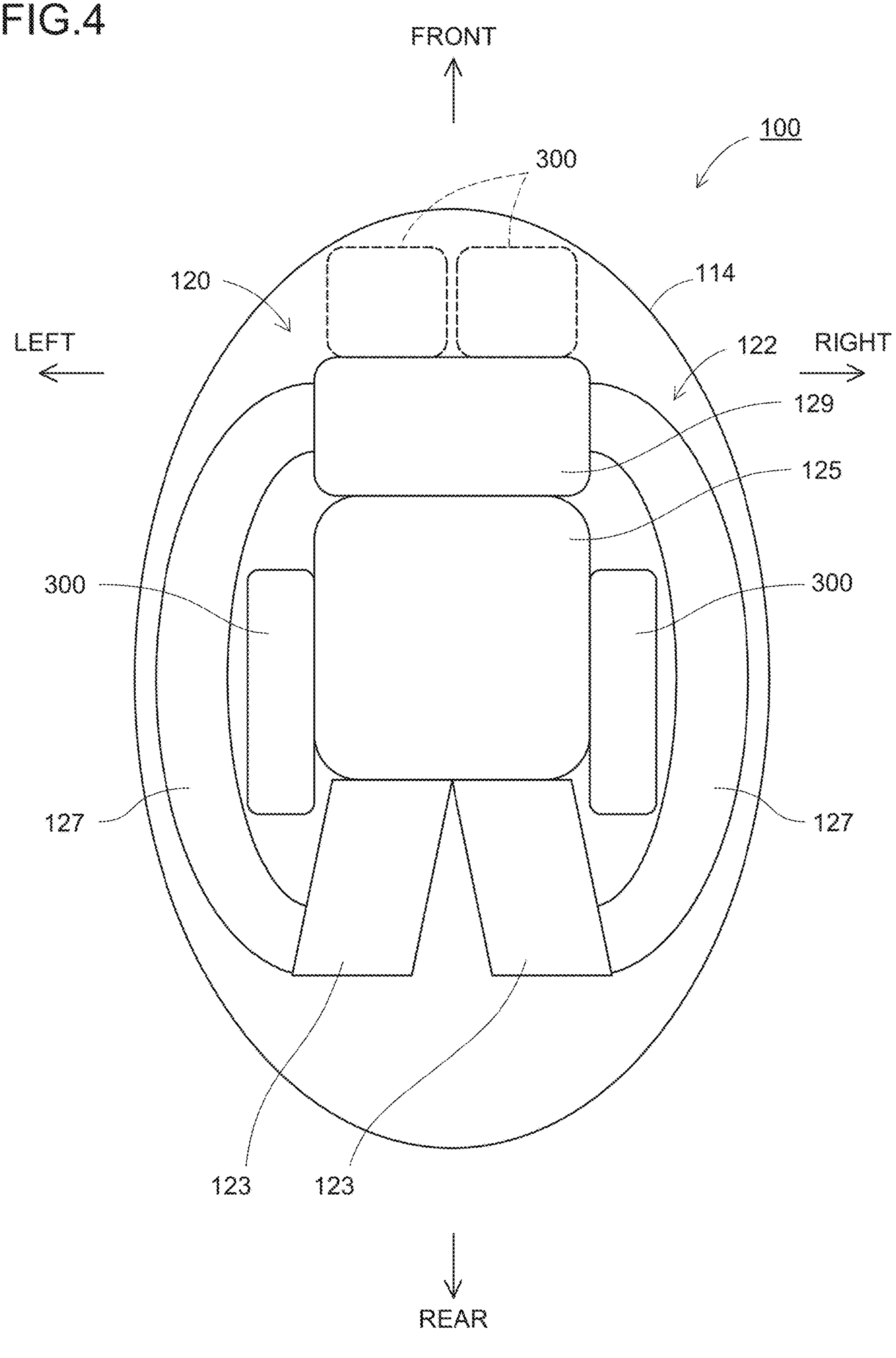
FIG. 4 is a top view schematically illustrating a configuration of an engine assembly.

FIG. 4 is a top view schematically illustrating a configuration of the engine assembly 120. As shown in FIG. 4, the outboard motor 100 is provided with a pair of fuel supply mechanisms 300. In short, the liquid fuel F stored in the fuel tank 260 in the hull 200 is supplied to the engine main body 122 via the pair of fuel supply mechanisms 300. Therefore, the suction load of the liquid fuel F from the fuel tank 260 is distributed to the pair of suction pumps 310, and furthermore, the amount of vapor generated in the liquid fuel F is distributed to the two vapor separator tanks 320. As a result, the occurrence of a fuel supply shortage to the engine main body 122 caused by a vapor lock in the suction pump 310 may be reduced or prevented by the lower suction capacity of the liquid fuel F required for one fuel supply mechanism 300 as compared with, e.g., a configuration including only one fuel supply mechanism.

In the upper-lower directional view, the pair of fuel supply mechanisms 300 are positioned bilaterally symmetrically with respect to a crankcase 125 of the engine main body 122. For this reason, the left-right layout of the outboard motor 100 may be made common in contrast to, e.g., a configuration in which a pair of fuel supply mechanisms 300 are arranged bilaterally asymmetrically. Specifically, the crankcase 125 houses a pair of cylinder blocks and crankshafts. The pair of banks 123 are project rearward from the crankcase 125. The left fuel supply mechanism 300 supplies liquid fuel F to the left bank 123 through the discharge pipe 342 (not shown in FIG. 4). The right fuel supply mechanism 300 supplies liquid fuel F to the right bank through the discharge pipe 342 (not shown in FIG. 4).

A mixing body 129 is positioned in front of the crankcase 125. A pair of intake manifolds 127 branching from the mixing body 129 are connected to each of the pair of banks 123. Specifically, the left intake manifold 127 is connected from the mixing body 129 through the left side of the crankcase 125 to the left bank 123. The right intake manifold 127 is connected from the mixing body 129 through the right side of the crankcase 125 to the right bank 123. Thus, the air sucked in the mixing body 129 is distributed to each of the pair of banks 123 via the pair of intake manifolds 127. In the upper-lower directional view, each of the fuel supply mechanisms 300 is positioned between the crankcase 125 and the intake manifold 127.

The pair of fuel supply mechanisms 300 are arranged at the same height in the upper-lower direction. Therefore, the variation in the suction capacity of the liquid fuel F in the pair of fuel supply mechanisms 300 is reduced or prevented compared with a configuration in which the pair of fuel supply mechanisms 300 are arranged at different heights. In addition, the capacities (volumes of the housing spaces 322) of the vapor separator tanks 320 of each of the pair of fuel supply mechanisms 300 are the same as each other.

Figure 5:
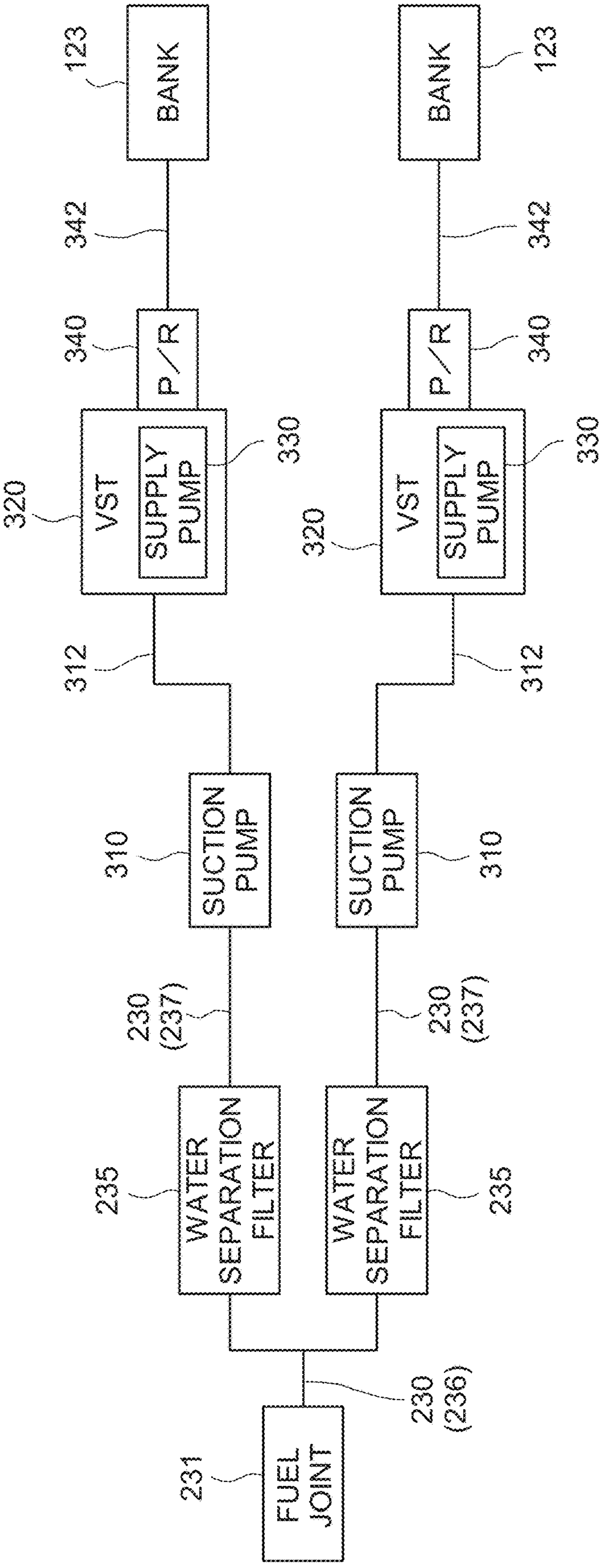
FIG. 5 is a schematic diagram illustrating a piping configuration of the engine assembly.

FIG. 5 is a schematic diagram illustrating a piping configuration of the engine assembly 120. As shown in FIG. 5, the upstream pipe 230 includes a main pipe 236 and a pair of branch pipes 237. One end of the main pipe 236 is connected to the fuel joint 231. The pair of branch pipes 237 branch from the other end of the main pipe 236. The downstream ends of the pair of branch pipes 237 are each connected to the suction pump 310 of the pair of fuel supply mechanisms 300. This simplifies the piping configuration compared to, e.g., a configuration in which a pair of fuel supply mechanisms 300 are connected to the fuel tank 260 through independent piping.

Each of the pair of branch pipes 237 is provided with the water separation filter 235. As a result, the load of removing foreign matter in one water separation filter 235 may be reduced compared with, e.g., a configuration in which only one water separation filter 235 is provided in the main pipe 236. In addition, the height differences in the pair of branch pipes 237 (the height differences in one branch pipe 237 and the height differences in the other branch pipe 237) are the same as each other. As a result, it is possible to reduce or prevent a variation in the suction performance of the liquid fuel F in the pair of fuel supply mechanisms 300 due to the same height differences in the pair of branch pipes 237 compared with, e.g., a configuration in which the height differences in the pair of branch pipes 237 are different from each other. It should be noted that the lengths of the pair of branch pipes 237 are the same. However, the lengths of the pair of branch pipes 237 may be different from each other depending on the layout of the engine assembly 120.

The techniques disclosed herein are not limited to the above-described preferred embodiments and may be modified in various forms without departing from the gist of the present invention, including the following modifications.

The configuration of the boat 10 of the above preferred embodiments is only an example and may be changed. For example, in the above preferred embodiments, the engine main body 122 is a V-type engine including a pair of banks 123, but the configuration is not limited to this, and the engine main body 122 may be an engine including only one bank or an engine including three or more banks (e.g., a W-type engine).

In the above preferred embodiments, the suction pump 310 is arranged outside the vapor separator tank 320, but the suction pump 310 may be housed in the housing space 322 of the vapor separator tank 320. In addition, in the above preferred embodiments, the suction pump 310 and the vapor separator tank 320 are integral and unitary, but the configuration is not limited to this, and the suction pump 310 and the vapor separator tank 320 may be separated and spaced apart from each other.

In the above preferred embodiments, the pair of fuel supply mechanisms 300 may be arranged, e.g., in front of the mixing body 129 (see dotted line in FIG. 4). In addition, the pair of fuel supply mechanisms 300 may be arranged on one side of the engine main body 122 in the left-right direction (e.g., on the right or left side). The outboard motor 100 may be provided with three or more fuel supply mechanisms 300. In the above preferred embodiments, a pair of fuel supply mechanisms 300 may be arranged asymmetrically or a pair of fuel supply mechanisms 300 may be arranged at different heights from each other. The capacities (volumes of the housing spaces 322) of the vapor separator tanks 320 of each of the pair of fuel supply mechanisms 300 may be different from each other.

In the above preferred embodiments, the pivot shaft L of the pivot arm 354 may be positioned behind the float 356. The vapor separator tank 320 may be provided with an opening/closing valve different from the float type (e.g., a controlled opening/closing valve).

Figure 6:
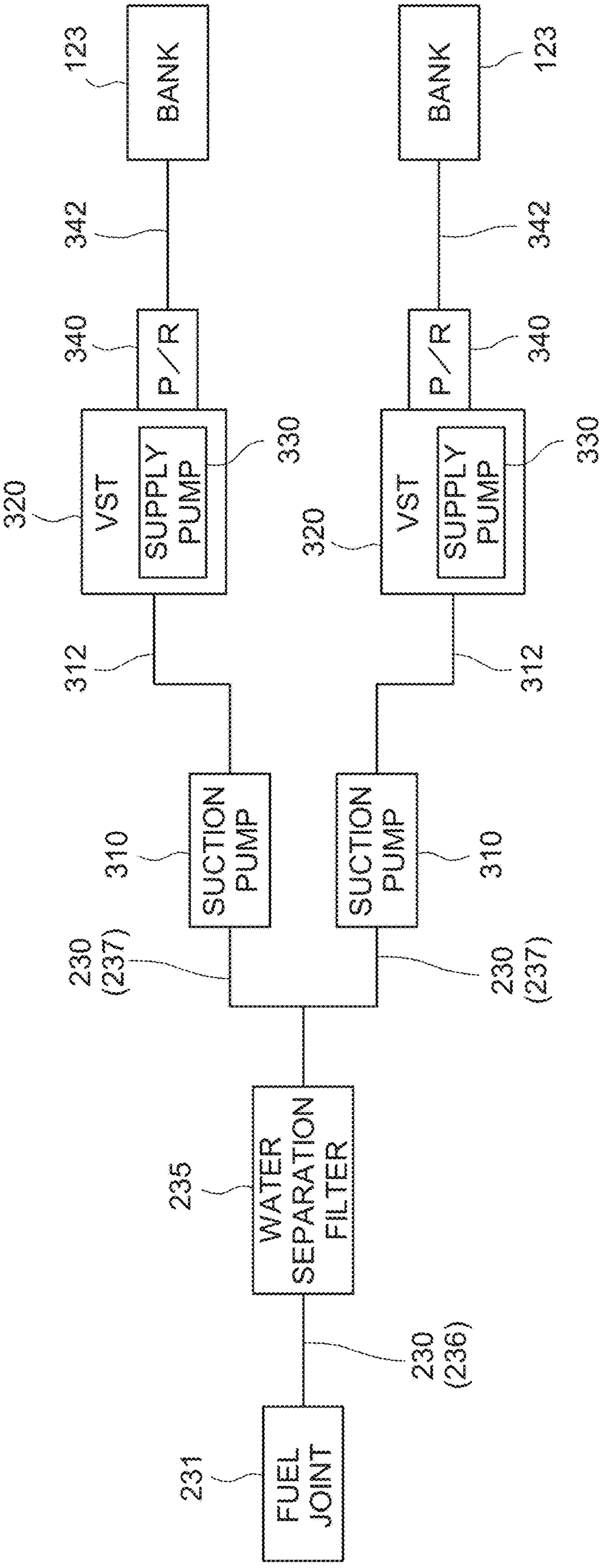
FIG. 6 is a schematic diagram illustrating a piping configuration of the engine assembly in a modified preferred embodiment of the present invention.

FIG. 6 is a schematic diagram illustrating a piping configuration of the engine assembly 120 in a modified preferred embodiment of the present invention. In FIG. 6, the main pipe 236 is provided with one water separation filter 235, and the pair of branch pipes 237 have no water separation filter 235. As a result, the number of parts can be reduced by reducing the number of water separation filters 235, and the piping configuration can be simplified. In the above preferred embodiments and the modified preferred embodiment, the water separation filter 235 may not be provided.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
an engine;
a plurality of fuel supply mechanisms each including a suction pump to suck in liquid fuel stored in a fuel tank in a hull, and a supply pump to supply the liquid fuel from the suction pump to the engine; and
a main pipe connected to the fuel tank and a plurality of branch pipes branching from the main pipe; wherein
the plurality of branch pipes communicate with respective suction pumps of the plurality of fuel supply mechanisms.

2. The outboard motor according to claim 1, wherein the plurality of fuel supply mechanisms are arranged at a same height in an upper-lower directional view of the outboard motor.

3. The outboard motor according to claim 1, wherein the plurality of fuel supply mechanisms are positioned symmetrically with respect to a left-right center position of the outboard motor.

4. The outboard motor according to claim 1, further comprising:
a vapor separator tank in each of the plurality of fuel supply mechanisms and including:
an introduction hole to communicate with the suction pump;
a float; and
an opening/closing valve that moves to a closing position to close the introduction hole and an opening position to open the introduction hole according to an up/down movement of the float.

5. The outboard motor according to claim 4, wherein
the outboard motor is tiltable around a tilt shaft; and
the vapor separator tank further includes a pivot arm between the tilt shaft and the float in a front-rear direction to support the float and allow the float to pivot about a pivot shaft along the tilt shaft.

6. The outboard motor according to claim 1, wherein
the engine includes a plurality of banks; and
each of the plurality of fuel supply mechanisms individually supplies liquid fuel to each of the plurality of banks.

7. The outboard motor according to claim 1, wherein each of the plurality of branch pipes has a same height difference.

8. The outboard motor according to claim 1, wherein each of the plurality of branch pipes includes a water separation filter.

9. The outboard motor according to claim 4, wherein capacities of the vapor separator tanks in at least two of the plurality of fuel supply mechanisms are the same.

10. The outboard motor according to claim 4, wherein capacities of the vapor separator tanks in at least two of the plurality of fuel supply mechanisms are different from each other.

11. A boat comprising:
a hull; and
the outboard motor according to claim 1 mounted at a rear of the hull.

12. An outboard motor comprising:
an engine; and
a plurality of fuel supply mechanisms each including a suction pump to suck in liquid fuel stored in a fuel tank in a hull, a vapor separator tank to store liquid fuel sucked in by the suction pump and separate the liquid fuel and vapor, and a supply pump to supply the liquid fuel stored in the vapor separator tank to the engine; wherein
the vapor separator tank in each of the plurality of fuel supply mechanisms includes:
an introduction hole to communicate with the suction pump;
a float; and
an opening/closing valve that moves to a closing position to close the introduction hole and an opening position to open the introduction hole according to an up/down movement of the float;
the outboard motor is tiltable around a tilt shaft; and
the vapor separator tank further includes a pivot arm between the tilt shaft and the float in a front-rear direction to support the float and allow the float to pivot about a pivot shaft along the tilt shaft.

13. An outboard motor comprising:
an engine;
a plurality of fuel supply mechanisms each including a suction pump to suck in liquid fuel stored in a fuel tank in a hull, a vapor separator tank to store liquid fuel sucked in by the suction pump and separate the liquid fuel and vapor, and a supply pump to supply the liquid fuel stored in the vapor separator tank to the engine; and
a main pipe connected to the fuel tank and a plurality of branch pipes branching from the main pipe; wherein
the plurality of branch pipes communicate with respective suction pumps of the plurality of fuel supply mechanisms.

* * * * *